United States Patent Office 3,395,187
Patented July 30, 1968

3,395,187
PROCESS FOR PREPARING VINYL FLUORIDE
AND 1,1-DIFLUOROETHANE
Frank Joseph Christoph, Jr., Elkton, Md., assignor to E. I.
du Pont de Nemours and Company, Wilmington, Del.,
a corporation of Delaware
No Drawing. Continuation-in-part of application Ser. No.
236,411, Nov. 8, 1962. This application May 3, 1965,
Ser. No. 452,841
5 Claims. (Cl. 260—653.4)

This application is a continuation-in-part of my copending application, Ser. No. 236,411, filed Nov. 8, 1962, now abandoned.

This invention is directed to a process for the manufacture of vinyl fluoride and 1,1-difluoroethane. More particularly, the present invention is directed to a process for preparing vinyl fluoride and 1,1-difluoroethane by passing acetylene and hydrogen fluoride over an aluminum oxide catalyst which has been pretreated with hydrogen fluoride.

A process for reacting acetylene with hydrogen fluoride over a catalyst chosen from aluminum oxide and aluminum fluoride is described in U.S. 2,471,525. While the aluminum oxide catalyst described in U.S. 2,471,525 is a usable catalyst system, it has the distinct disadvantage in the initial stages of the system of forming water and considerable tars and gaseous by-products. Tars lead to much pluggage of equipment, causing considerable lost time. Water is undesirable since it combines with unreacted hydrogen fluoride to form a highly corrosive liquid which causes severe damage to manufacturing equipment. Also, the yields of vinyl fluoride and 1,1-difluoroethane are quite low over a fresh aluminum oxide catalyst system although the conversion of acetylene to other, undesired gaseous hydrocarbon by-products is reasonably high. These gaseous hydrocarbons not only waste acetylene but also cause considerable difficulty in the separation and purification of the desired products from the reaction mixture.

It is, therefore, an object of the present invention to provide a new process for preparing vinyl fluoride and 1,1-difluoroethane.

It is another object of the present invention to provide an improved process for preparing vinyl fluoride and 1,1-difluoroethane using a porous aluminum oxide catalyst which does not cause formation of water and large amounts of undesirable by-products in the initial stages of the process.

These and other objects will become apparent from the following description and claims.

More specifically, the present invention is directed to an improved process for preparing vinyl fluoride and 1,1-difluoroethane which process comprises (a) Passing anhydrous hydrogen fluoride over an aluminum oxide catalyst, i.e., activated alumina (aluminum oxide) or aluminum oxide hydrate, at from about 200° C. to about 500° C. until from about 0.3 mole to about 6 moles of hydrogen fluoride per mol of aluminum oxide have reacted with the aluminum oxide catalyst, then (b) Passing a mixture of anhydrous hydrogen fluoride and acetylene in the molar ratio of from about one to about 5 moles of hydrogen fluoride per mole of acetylene over the said treated aluminum oxide catalyst at from about 250° C. to about 400° C., at from 0.1 to 4 atmospheres and at feed rates of from about 10 to about 4,000 milliliters of acetylene at standard conditions per gram of catalyst per hour, and (c) Recovering vinyl fluoride and 1,1-difluoroethane from the reaction mixture.

The present process comprises three steps, (a) treating the porous aluminum oxide catalyst, i.e., activated alumina (aluminum oxide) or aluminum oxide hydrate, with anhydrous hydrogen fluoride at temperatures of 200° C. to 500° C. and (b) passing mixtures of acetylene and hydrogen fluoride over the thus prepared catalyst, and (c) recovering from the reaction mixture vinyl fluoride and 1,1-difluoroethane.

In step (a) there appears to be a reaction between the aluminum catalyst and the hydrogen fluoride for water is formed which can only be accounted for if it is assumed that the aluminum oxide catalyst ($Al_2O_3$) is converted to aluminum fluoride ($AlF_3$). The X-ray diffraction studies of the treated catalyst confirms this reaction by indicating that aluminum fluoride is formed. When sufficient hydrogen fluoride is added, the aluminum oxide ceases to react further. Although it is preferred to completely react the aluminum oxide with hydrogen fluoride, corresponding benefit is gained by partial reaction of the aluminum catalyst with hydrogen fluoride. Partial reaction of aluminum oxide with hydrogen fluoride during the pretreatment results in less water, by-products and tar formation during the subsequent reaction of acetylene with hydrogen fluoride. To completely react aluminum oxide with hydrogen fluoride requires six moles of hydrogen fluoride per mole of aluminum oxide. Since the reaction of gaseous flowing hydrogen fluoride with aluminum oxide is usually incomplete, the best results are obtained if about 6.5 moles of hydrogen fluoride per mole of aluminum oxide are used. Naturally, more than 6.5 moles of hydrogen fluoride may be used and as high as 18 moles of hydrogen fluoride per mole of aluminum oxide have been used, but the excess hydrogen fluoride passes through largely unreacted and gives little additional useful advantage. However, there is no useful benefit to the catalyst system if less than about 0.3 mole of hydrogen fluoride per mole of aluminum oxide reacts.

The form of aluminum oxide used has some importance. The "activated aluminas" are the more preferred catalysts. "Activated aluminas" are prepared by the dehydration of hydrated aluminum oxide, such as aluminum oxide trihydrate and aluminum oxide monohydrate. Besides the activated alumina, the hydrates of aluminum oxide are useful as starting materials for the hydrogen fluoride pretreatment of this invention. In the preparation of the activated aluminas, the hydrates are dehydrated at temperatures below about 850° C. to give solid with a porous structure having a high surface area. If the hydrates are heated at temperatures above 950° C., an essentially inert material is obtained having a fused surface of low surface area. This material is essentially nonreactive with hydrogen fluoride. For further details on the processes for the preparation of activated aluminum, see Technical Paper No. 10, "Alumina and Its Properties" published by the Aluminum Company of America, 1960 Edition.

Two general types of hydrates of aluminum oxide are known as the mono- and trihydrates. Examples of these are diaspore (alpha-$Al_2O_3 \cdot H_2O$), boehmite (gamma-$Al_2O_3 \cdot H_2O$), bayerite (gamma-$Al_2O_3 \cdot 3H_2O$), and gibbsite (gamma-$Al_2O_3 \cdot 3H_2O$). The alpha and gamma designations are used to indicate whether alpha- or gamma-alumina is obtained by high temperature dehydration. The above four minerals and others containing these hydrates may be used directly as starting materials to prepare the catalyst of this invention.

The hydrogen fluoride pretreatment of the aluminum oxide or aluminum oxide hydrate catalyst is carried out at from 200° C. to 500° C. Below 200° C., essentially no water evolution occurs. Any water which may be formed is apparently retained in the solid material. This retained water leads to structural instability of the catalyst particles, making the removal of the catalyst from the reactor very difficult. At temperatures above 500° C. a less active form of the catalyst is obtained, apparently due to changes in crystal form or the like which affects the catalyst activity. It is preferred to carry out the catalyst pretreatment at 300° C. The rate of addition of hydrogen fluoride to aluminum oxide is not an important factor if the flow is sufficiently slow for a majority of the hydrogen fluoride to react. Feed rates of from 0.01 part to 2.0 parts of hydrogen fluoride per part of aluminum oxide per hour have been used and from 0.09 to 0.26 part of hydrogen fluoride per part of aluminum oxide per hour is most satisfactory. Under these conditions, water ceases to be formed after about 6.5 moles of hydrogen fluoride have been added, indicating that six moles have reacted. As a general procedure, the best catalyst is obtained if hydrogen fluoride is added until water ceases to be formed.

The pretreatment of the aluminum oxide is preferably, although not essentially, carried out in a flow system. The advantage of the flow system is that the water which is formed can be driven out of the reaction system by the flow of the hydrogen fluoride gas. Since mixtures of water and hydrogen fluoride are highly corrosive, it is preferable during the pretreatment to neutralize the water-hydrogen fluoride off-gases. The treated solid may be swept with an inert gas such as nitrogen to remove any remaining water and excess hydrogen fluoride, if desired, although it is not essential to do so. When pretreating the aluminum oxide hydrates with hydrogen fluoride, the corrosive problem of mixtures of water and hydrogen fluoride is enlarged by the greater volume of water evolved by the process. Therefore, an alternate procedure which is preferred when using the hydrates consists of first dehydrating the hydrates by heating at say 400° C., and thereafter treating the dehydrated aluminum catalyst with hydrogen fluoride. The hydrogen fluoride treatment of the dehydrated catalyst is the same then as used with activated alumina.

Fused alumina, obtained by dehydration of aluminum oxide hydrates at higher temperatures than 850° C., is of no value in the present invention since, as indicated earlier, it is essentially nonreactive with hydrogen fluoride. For this reason the starting material for the catalyst of the present invention must be selected from either forms of activated alumina or aluminum oxide hydrates.

In the disclosure of U.S. 2,471,525, it was reasoned that, if any reaction at all occurred between the aluminum oxide and hydrogen fluoride, an aluminum oxyfluoride was formed on the surface of the catalyst. The disclosure also stated that the quantity of aluminum fluoride formed was exceedingly small. It has been found that the present pretreatment of aluminum oxide with hydrogen fluoride does lead to formation of aluminum fluoride. If sufficient hydrogen fluoride is used, as in the preferred mode of pretreatment, the aluminum oxide appears to be essentially completely converted to aluminum fluoride. X-ray diffraction patterns of the resulting catalyst material indicate that a mixture of four crystalline forms of aluminum fluoride are present which are readily distinguished by their X-ray diffraction patterns. Only one crystalline form of aluminum fluoride has been described in the art (ASTM Card 9–138) which is herein called $\alpha$-aluminum fluoride. The three undescribed forms have been named $\beta$-aluminum fluoride, gamma-aluminum fluoride and delta-aluminum fluoride. These four forms are characterized as follows:

| Crystalline Form | $\alpha$-AlF$_3$ | $\beta$-AlF$_3$ | gamma-AlF$_3$ | delta-AlF$_3$ |
| --- | --- | --- | --- | --- |
| Space Group | $D_3^7$-R32 | $D_{6h}^4$-P6/mmc | $D_{3d}^6$-R3C | $O_h^9$-Imcm |
| Cell Parameters, A | a=4.297 c=12.445 | a=6.93 c=7.125 | a=5.01 c=12.23 | a=14.34 |
| Cell Volume, A.$^3$ | 2,615 | 2,965 | 3,459 | 29,500 |
| Molecule, AlF$_3$ Unit Cell | 6 | 6 | 6 | 64 |
| Calculated Density, g./cc. | 3.197 | 2.815 | 3.130 | 3.025 |

The known $\alpha$ form is a relatively poor catalyst for the reaction of acetylene with hydrogen fluoride. The catalyst obtained by the present pretreatment is a surprisingly effective catalyst for the reaction of acetylene with hydrogen fluoride. Since $\beta$, gamma, and delta forms of aluminum fluoride are converted to $\alpha$-aluminum fluoride by heating above 600° C., the loss of catalyst activity due to overheating may be due to this conversion. The new $\beta$-aluminum fluoride may be prepared independently by dehydration of $\alpha$-aluminum fluoride trihydrate at 200° C. to 500° C. The new gamma form of aluminum fluoride may be prepared independently by dehydration of the known $\beta$-aluminum fluoride trihydrate. There is no method known at present for preparing the new delta form of aluminum fluoride independently.

It should be understood that the present invention does not depend on conversion of the aluminum oxide catalyst, in part or in toto, to any form of aluminum fluoride. The present invention resides in the pretreatment of the aluminum oxide catalyst and the improved results obtained thereby. What occurs during the pretreatment as previously described is incidental and the invention is not meant to be limited thereby.

The process of reacting acetylene and hydrogen fluoride is carried out by passing mixtures of the two reactants over the pretreated catalyst. The reaction temperature may vary from about 250° C. to about 400° C. Below about 250° C., the reaction is too slow to be of commercial interest. Above about 400° C., the yield of by-products increases and above 500° C., the catalyst is deactivated. The preferred reaction temperature is about 300° C. to 350° C.

The mole ratio of hydrogen fluoride to acetylene may vary from about one to about five moles of hydrogen fluoride per mole of acetylene. Below about one mole, the conversion of acetylene is undesirably low, resulting in large acetylene recovery and recycle or removal problems. The excess hydrogen fluoride resulting from mole ratios much above five has no significant effect on the conversion of acetylene to products. More than five moles can be used but there is no advantage gained thereby. The preferred mole ratio is about 1.3 moles of hydrogen fluoride per mole of acetylene.

The feed rate of acetylene is measured in milliliters at standard conditions per gram of catalyst per hour. The volume of acetylene is measured at 25° C. and one atmosphere regardless of the actual temperature and pressure used during reaction. The feed rate of acetylene, using the mole ratios described above, may vary between about 10 and 4,000 ml. of acetylene per g. of catalyst per hour. Feed rates of less than 400 ml./g./hr. are preferred.

Feed rates below 10 ml./g./hr. lead to higher by-product yields and low production rates while feed rates above 4,000 ml./g. hr. lead to commercially unattractive acetylene conversions.

The reaction pressure may vary from 0.1 to 4 atmospheres. It is preferred to operate at atmospheric pressure or above due to the difficulties encountered in operating flow systems at subatmospheric pressures. The preferred pressure is 25 to 45 p.s.i.g.

The reaction between hydrogen fluoride and acetylene over the pretreated aluminum oxide catalyst is generally carried out in a flow system. The reaction equipment must be resistant to hydrogen fluoride. When dry, steel is suitable although it is preferred to use stainless steel, nickel or the high nickel alloys such as "Inconel" or "Monel." The reaction may be carried out in any type reactor designed to contact gases with solids at elevated temperatures; vertical, tubular reactors are a convenient form. Heating may be carried out using any system known to the art which allows sufficient temperature control. Electric heaters, molten salt baths and the like are particularly useful.

The reactants should be reasonably dry. Anhydrous hydrogen fluoride contains traces of water which can be tolerated. Acetylene often contains acetone, water and other impurities which should be removed by methods well known to the art. One such method is described in U.S. 2,716,142, column 3, line 72, to column 4, line 5. The acetylene used in the examples below was purified in a similar manner to that disclosed in U.S. 2,716,142.

The reaction products consist of hydrogen fluoride, acetylene, vinyl fluoride, 1,1-difluoroethane and occasionally a number of by-products. Hydrogen fluoride is readily separated from the remainder of the products by a simple distillation. The organic materials are separable by properly designed pressure distillation equipment. The recovered hydrogen fluoride and acetylene may be recycled if desired. Hydrogen fluoride and acetylene may also be removed by treatment with alkaline solution and solutions of certain metals known to the art, for example, copper. Distillation is generally preferred.

It has been found that increasing the reaction pressure, keeping the feed rate, mole ratio and temperature constant, increases the conversion of acetylene to products. The relative yield of 1,1-difluoroethane, compared to vinyl fluoride, is not noticeably affected by a pressure increase. Hence, an economic advantage is gained by higher conversions and productivity with smaller acetylene recovery and recycle streams. The preferred conditions cited hereinbefore are those which give the optimum yields of vinyl fluoride.

Increasing the flow rate above a certain limiting rate decreases conversion. Feed rates which are sufficiently slow do not completely utilize the catalyst and feed rate changes have no apparent effect on conversion. When the catalyst is completely utilized, feed rate affects conversion. By-product formation is favored by slow feed rates. The process is defined in terms of feed rate in ml. acetylene/g. catalyst/hr. rather than residence time since the former is accurately determined while the latter is subject to many errors.

While the disclosure in U.S. 2,471,525 indicated that there might be some slight reaction between hydrogen fluoride and aluminum oxide catalyst, the disclosure gave no indication that their aluminum oxide catalyst has an induction period during which yields of vinyl fluoride and 1,1-difluoroethane are low, during which tar and gaseous by-product formation is undesirably high and during which water formation takes place. While water formation is readily explained by reaction between hydrogen fluoride and aluminum oxide, the low initial yields of vinyl fluoride and 1,1-difluoroethane and high yields of tar and gaseous by-products are not readily explained unless it is assumed that aluminum oxide is a poor catalyst for the reaction of hydrogen fluoride with acetylene and a good catalyst for converting acetylene to gaseous by-products and higher molecular weight polymeric products. As is shown in the examples which follow, pretreated aluminum oxide catalyst does away with this induction period and the problems it introduces. The gaseous by-products consist of alkanes and alkenes such as ethane, ethylene, propane, propylene, butylene, and the like.

Representative examples illustrating the present invention follow.

Example I.—Catalyst pretreatment (A) Activated alumina (60 g., grade F-10, Alcoa) was placed in a one-inch (inside diameter) stainless steel pipe reactor fitted with means for admitting hydrogen fluoride and nitrogen and removing off-gases. The reactor was immersed in a molten salt bath at 300° C. and anhydrous hydrogen fluoride was fed over the alumina (229 g., 7.30 moles per mole of alumina) in a period of five and one-half hours. Nitrogen was then passed through the reactor to remove excess hydrogen fluoride and other volatile materials. After cooling, the treated alumina was found to be identical in appearance to the original alumina. Both color and geometry were retained.

(B) Example I-A was repeated at 175° C. After cooling, it was found that the treated alumina had both aggregated and pulverized. It was difficult to remove from the reactor.

(C) Example I-A was repeated by treating 236 g. of alumina with 510 g. of hydrogen fluoride (11.0 moles per mole of alumina) at 300° C. over a 23 hour period. The product weighed 337.8 g. It retained its color and form.

(D) Example I-C was repeated using 302 g. of hydrogen fluoride (6.5 moles per mole of alumina). The product weighed 337.6 g. It retained its color and form.

Comparison of Examples I-C and I-D shows that excess hydrogen fluoride over 6.5 moles per mole of alumina has no apparent effect on the product.

Example II

The catalyst prepared in Example I-C was placed in a one-inch (inside diameter) vertically mounted, tubular reactor of stainless steel fitted with means for feeding gaseous acetylene and hydrogen fluoride into the reactor and removing the products from the reactor. The reactor was immersed in a molten salt bath at 350° C. A preheated mixture of hydrogen fluoride and acetylene in the molar ratio of 1.3 moles of hydrogen fluoride per mole of acetylene was fed into the reactor at the rate of 45.3 ml. acetylene/g. catalyst/hr. The product issuing from the reactor was scrubbed with dilute aqueous potassium hydroxide, dried and analyzed by means of a mass spectrometer. Alternatively, the hydrogen fluoride can be separated from the other products by fractional distillation at atmospheric pressure using a condenser temperature of from −20° C. to 0° C. The results tabulated below indicate the composition of the acid-free product at the end of the first and fourth hours of operation along with the conversions and yields indicated thereby.

RESULTS

| Time on Stream | 1 hr. | 4 hrs. |
| --- | --- | --- |
| Mole percent Products (acid free): | | |
| Vinyl Fluoride | 74.8 | 75.4 |
| 1,1-difluoroethane | 10.7 | 8.9 |
| Acetylene | 4.7 | 6.5 |
| Propylene | 1.1 | 0.4 |
| Ethylene | 8.2 | 7.6 |
| Ethane | 0.5 | 0.2 |
| Propane | 0.1 | 0.05 |
| Percent Conversion | 95.8 | 93.98 |
| Percent Yield: | | |
| Vinyl Fluoride | 69.8 | 74.3 |
| 1,1-difluoroethane | 10.0 | 8.3 |
| By-products | 20.2 | 17.0 |

Essentially no water or tar was formed during the period of operation.

Example III

The acetylene feed rate of Example II was increased to 67.9 ml. acetylene/g./hr. at 350° C., at a mole ratio of 1.3. After 4 hours of operation, the product had the following composition.

RESULTS

Mole percent products:
- Vinyl fluoride — 77.0
- 1,1-difluoroethane — 11.9
- Acetylene — 5.6
- Propylene — 0.1
- Ethylene — 5.1
- Ethane — 0.1

Percent conversion — 94.7

Percent yield:
- Vinyl fluoride — 77.2
- 1,1-difluoroethane — 12.0
- By-products — 10.8

Examples II and III are illustrative of the case where feed rates have little effect on conversion as explained hereinbefore.

Example IV

Example II was repeated using a feed rate of 29.7 ml. acetylene/g./hr., 350° C. and a mole ratio of 2.5. The following results were obtained after four hours of operation.

RESULTS

Mole percent products:
- Vinyl fluoride — 68.0
- 1,1-difluoroethane — 21.2
- Acetylene — 4.7
- Propylene — 0.3
- Ethylene — 5.6
- Ethane — 0.2

Percent conversion — 95.6

Percent yield:
- Vinyl fluoride — 66.7
- 1,1-difluoroethane — 20.8
- By-products — 12.5

Comparing this example with Example II, which differs only in the mole ratio, shows that the primary effect of a larger mole ratio is to increase the yield of 1,1-difluoroethane at the expense of vinyl fluoride.

Example V

Example II was repeated with the reaction temperature being raised from 350° C. to 400° C. as the only change in procedure. Under these conditions the product had the following composition after four hours operation.

RESULTS

Mole percent product:
- Vinyl fluoride — 66.4
- 1,1-difluoroethane — 8.9
- Acetylene — 15.7
- Ethylene — 8.7
- Ethane — 0.4

Percent conversion of acetylene — 85.7

Percent yield:
- Vinyl fluoride — 70.7
- 1,1-difluoroethane — 9.5
- By-products — 19.8

This example illustrates the higher by-product yield which accompanies higher temperatures.

Example VI

Using the reaction system of Example II, 237 g. of activated alumina (F–10 grade of Alcoa) was placed in the reactor. The reactor was then heated to 350° C. in the molten salt bath and a preheated mixture of hydrogen fluoride and acetylene in the mole ratio of 1.3:1 was passed into the reactor at a rate of 45.2 ml. acetylene/hr./g. of catalyst. The product was treated as in Example II. There was some tar formed. The composition of the gaseous product was determined after one and four hours of operation with the results shown below.

RESULTS

| Time on Stream | 1 hr. | 4 hrs. |
|---|---|---|
| Mole percent Product: | | |
| Vinyl fluoride | 19.3 | 56.6 |
| 1,1-difluoroethane | 13.1 | |
| Acetylene | 34.5 | 17.7 |
| Propylene | 9.7 | 9.4 |
| Ethylene | 21.4 | 13.2 |
| Ethane | 1.4 | 0.8 |
| Propane | 0.4 | 0.5 |
| Butene | | 1.8 |
| Percent Conversion | 76.1 | 87.4 |
| Percent Yield: | | |
| Vinyl Fluoride | 17.5 | 46.1 |
| 1,1-difluoroethane | 11.9 | 0 |
| By-product | 70.6 | 53.9 |

By comparison of the results obtained at four hours with the results obtained at one hour, it is readily apparent that the catalyst improves with time. Compare however the results of this example with those of Example II. The only difference between Example II and Example VI is the pretreatment of the catalyst used in Example II. The time of use has only a slight effect on the results of Example II and the yields obtained are far superior to those obtained in Example VI. It is quite surprising that a simple pretreatment should produce such a remarkably superior catalyst, particularly since the disclosure in U.S. 2,471,525 does not indicate that there is any difference between aluminum oxide and aluminum fluoride as catalyst materials.

Example VII

α-Aluminum fluoride (209.07 g.), used as granulated material obtained by crushing pellets obtained from Harshaw Chemical Co., was placed in the reactor described in Example II. The reactor was then heated in the molten salt bath as before and preheated mixtures of anhydrous hydrogen fluoride and acetylene were passed into the reactor. The reaction conditions used and the results obtained are given below.

CONDITIONS

| Run | Mole Ratio, $HF/C_2H_2$ | Temperature, °C. | Acetylene Feed Rate, ml./g. catalyst/hr. |
|---|---|---|---|
| (a) | 2.4 | 315 | 26.1 |
| (b) | 2.4 | 315 | 30.0 |
| (c) | 2.4 | 315 | 43.8 |
| (d) | 1.3 | 320 | 43.5 |
| (e) | 1.3 | 346 | 38.8 |

RESULTS

| Run | (a) | (b) | (c) | (d) | (e) |
|---|---|---|---|---|---|
| Mole Percent Product: | | | | | |
| Vinyl Fluoride | 28.0 | 39.8 | 34.1 | 42.0 | 52.0 |
| 1,1-difluoroethane | 21.4 | 22.1 | 17.5 | 13.8 | 10.7 |
| Ethylene | 0.8 | 0.6 | 0.4 | 1.7 | 3.8 |
| Acetylene | 49.9 | 36.8 | 47.6 | 40.5 | 34.8 |
| Propane | 0.01 | 0.01 | 0.01 | 0.01 | 0.01 |
| Ethane | 0.01 | 0.1 | 0.06 | 0.03 | 0.08 |
| Percent Conversion | 50.1 | 63.2 | 52.4 | 59.5 | 65.2 |
| Percent Yield: | | | | | |
| Vinyl Fluoride | 55.4 | 63.0 | 65.0 | 79.6 | 79.8 |
| 1,1-difluoroethane | 42.7 | 35.0 | 33.5 | 23.2 | 16.4 |

Comparing the runs of this example and particularly run (e) with Example IV indicates that the pretreated catalyst is also superior to ordinary α-aluminum fluoride as a catalyst, giving ca. 30% higher conversions at 75% greater feed rates; hence considerably greater production rates.

Example VIII

Example II was repeated at 45 p.s.i.g. pressure with a flow rate of 115.1 ml. acetylene (at 25° C. and one atmosphere)/g. catalyst/hr. and a mole ratio of HF/acetylene of 1.63. The results are shown below.

RESULTS

Mole percent products:
  Vinyl fluoride _____ 54.7
  1,1-difluoroethane _____ 29.8
  Acetylene _____ 7.6
  Ethylene _____ 0.8
  Propylene _____ 0.1
  Ethane _____ 0.05
Percent conversion _____ 91.9
  Vinyl fluoride _____ 63.2
  1,1-difluoroethane _____ 34.4
  By-products _____ 1.1

Example IX

The catalyst of Example I–C (5.0 g.) was placed in an 0.9 x 20.3 cm. tubular reactor fitted in the same manner as the previous examples. Preheated acetylene and hydrogen fluoride were passed into the reactor which was heated at 325° C. The mole ratio was 1.3 moles HF per mole of acetylene and the feed rate of acetylene was 3600 ml. (at standard conditions)/gram catalyst/hr. The reaction pressure was 30 p.s.i.g. The product was recovered as before. The results are shown below.

RESULTS

Mole percent products:
  Vinyl fluoride _____ 79.5
  1,1-difluoroethane _____ 16.7
  Acetylene _____ 3.0
  Ethylene _____ 0.9
Percent conversion _____ 97.0
Percent yield:
  Vinyl fluoride _____ 81.2
  1,1-difluoroethane _____ 17.0
  Ethylene _____ 1.8

Example X

Aluminum oxide trihydrate (390 g.) was placed in a 2 inch diameter stainless steel reactor which was immersed in a molten salt bath at 230° C. Anhydrous hydrogen fluoride (360 g.) was fed over the aluminum oxide trihydrate for a period of 10⅓ hours. Nitrogen was then passed through the reactor to remove excess hydrogen fluoride and other volatile materials. After cooling, the pretreated catalyst, amounting to 458 g., was analyzed and found to be essentially aluminum fluoride.

The above aluminum fluoride catalyst, in an amount of 105.5 g., was placed in a 1-inch x 30-inch stainless steel reactor to which was attached a similar tube as a preheater. The reactor and preheater were constructed in the form of a V and immersed in a molten salt bath at 320° C. Acetylene at 10 g./hr. and hydrogen fluoride at 11.6 g./hr. were passed over the catalyst for 47 hrs. Composition of the off-gas from the reactor after removal of hydrogen fluoride is shown below.

| Time, hrs. | Volume Percent | | | | | |
|---|---|---|---|---|---|---|
| | $CH_2=CHF$ | $CH_3CHF_2$ | $C_2H_2$ | $C_2H_2$ | $N_2$ or air | Unknown |
| 4 | 50.2 | 37.0 | 6.6 | 4.0 | 0.7 | 0.8 |
| 16 | 72.0 | 21.3 | 4.6 | 1.7 | 0.1 | |
| 35 | 72.3 | 19.5 | 7.4 | 0.8 | | |
| 47 | 68.0 | 16.0 | 15.3 | 0.6 | | |

Example XI

Six hundred grams of sucrose were dissolved in 1000 ml. of deionized water contained in a Sunbeam mixer, and six hundred grams of Boehmite (gamma-$Al_2O_3.H_2O$) were added to this solution with constant agitation. After addition was complete, the reaction was agitated for 20 additional minutes. The sucrose was added as a binder for the aluminum oxide monohydrate and as an agent to prevent the catalyst from aggregating during pretreatment. The solid catalyst was then collected and dried in an oven. The solids were heated according to the following schedule to remove the sucrose binder:

° C.: Hours
  150 _____ 4
  200 _____ 4
  250 _____ 4
  300 _____ 4
  400 _____ 36

The Boehmite catalyst was treated with 6 moles of anhydrous hydrogen fluoride per mole of aluminum for 10 hours at 270° C. A two-fold excess of hydrogen fluoride over the theoretical amount required was used.

X-ray analysis of the treated materials indicated the presence of both α- and β-aluminum fluoride. The catalyst was screened to remove fines.

Catalyst activity of the prepared $AlF_3$ was evaluated under the following conditions:

The catalyst, in an amount of 217 g., was placed in a reactor similar to that of Example X. The molten salt bath temperature was 320° C. The pressure in the reactor was 45 p.s.i.g. Acetylene at 1.01 gram moles/hr. and hydrogen fluoride at 1.05 gram moles/hr. was passed over the catalyst for the time periods indicated below. $CH_3CF_2$, in the amount of 0.73 gram mole/hr. was also passed over the catalyst in the feed in order to establish equilibrium conditions in the reaction and assimilate recycle conditions. Composition of the off-gas from the reactor after removal of hydrogen fluoride is shown below.

RESULTS

| Sample | Hrs. on Stream | Volume Percent | | | |
|---|---|---|---|---|---|
| | | $CHF_2CH_3$ | $C_2H_2$ | $CHF=CH_2$ | $C_2H_4$ |
| A | 1 | 31.56 | 1.53 | 61.96 | 4.94 |
| B | 2 | 35.12 | 1.48 | 59.32 | 4.08 |
| C | 3 | 33.11 | 0.90 | 62.29 | 3.70 |
| D | 6 | 26.27 | 0.75 | 71.45 | 1.53 |
| E | 12 | 38.16 | 1.22 | 59.56 | 1.06 |
| F | 19 | 32.93 | 0.27 | 65.83 | 0.97 |
| G | 25 | 31.02 | 3.82 | 64.25 | 0.91 |
| H | 31 | 32.18 | 3.53 | 63.46 | 0.83 |
| I | 41 | 27.42 | 3.63 | 68.10 | 0.85 |
| J | 51 | 19.86 | 5.80 | 73.47 | 0.87 |
| K | 62 | 30.16 | 4.21 | 64.90 | 0.73 |
| L | 70 | 30.89 | 4.04 | 64.21 | 0.85 |
| Average | | 29.97 | .53 | 65.37 | 1.13 |

At the end of the run the catalyst was found to be partially caked together at both ends. The center of the bed was free flowing.

It is understood that the preceding examples are representative and that said examples may be varied within the scope of the total specification, as understood by one skilled in the art, to produce essentially the same result.

As many apparently widely different embodiments of this invention may be made without departing from the spirit and scope thereof, it is understood that this invention is not limited to the specific embodiments thereof except as defined in the appended claims.

The embodiments of the invention in which an exclusive property or privilege is claimed are defined as follows:

1. A process for preparing vinyl fluoride and 1,1-difluoroethane which process comprises
  (a) passing anhydrous hydrogen fluoride at from about 200° C. to about 500° C. over a catalyst consisting essentially of an activated aluminum oxide or aluminum oxide hydrate until from about 0.3 mole to about 6 moles of hydrogen fluoride per mole of aluminum oxide have reacted with the aluminum oxide, then
  (b) passing a mixture of anhydrous hydrogen fluoride and acetylene at a temperature of from about 250° C. to about 400° C. and at a pressure from 0.1 to 4 atmospheres over said pretreated aluminum oxide catalyst, said mixture of hydrogen fluoride and acetylene having a molar ratio of from about 1 to about 5 moles of hydrogen fluoride per mole of acetylene, the feed rate of acetylene in said mixture being from about 10 to about 4,000 milliliters, measured at standard conditions, per gram of catalyst per hour, and (c) recovering from said reaction mixture vinyl fluoride and 1,1-difluoroethane.

2. A process for preparing vinyl fluoride and 1,1-difluoroethane which process consists essentially of (a) passing anhydrous hydrogen fluoride at from about 200° C. to about 500° C. over a catalyst consisting essentially of an activated alumina until from about 0.3 mole to about 6 moles of hydrogen fluoride per mole of activated alumina have reacted with the activated alumina, then (b) passing a mixture of anhydrous hydrogen fluoride and acetylene at a temperature of from about 250° C. to about 400° C. and at a pressure from 0.1 to 4 atmospheres over said pretreated activated alumina, said mixture of hydrogen fluoride and acetylene having a molar ratio of from about 1 to about 5 moles of hydrogen fluoride per mole of acetylene, the feed rate of acetylene in said mixture being from about 10 to about 4,000 milliliters measured at standard conditions per gram of catalyst per hour, and (c) recovering from said reaction mixture vinyl fluoride and 1,1-difluoroethane.

3. A process for preparing vinyl fluoride and 1,1-difluoroethane which process consists essentially of (a) passing anhydrous hydrogen fluoride at from about 200° C. to about 500° C. over an aluminum oxide hydrate until from about 0.3 mole to about 6 moles of hydrogen fluoride per mole of aluminum oxide have reacted with the aluminum oxide hydrate, then (b) passing a mixture of anhydrous hydrogen fluoride and acetylene at a temperature of from about 250° C. to about 400° C. and at a pressure of from 0.1 to 4 atmospheres over said pretreated aluminum oxide hydrate, said mixture of hydrogen fluoride and acetylene having a molar ratio of from about 1 to about 5 moles of hydrogen fluoride per mole of acetylene, the feed rate of acetylene in said mixture being from about 10 to about 4,000 milliliters measured at standard conditions per gram of catalyst per hour, and (c) recovering from said reaction mixture vinyl fluoride and 1,1-difluoroethane.

4. A process for preparing vinyl fluoride and 1,1-difluoroethane which process comprises (a) passing anhydrous hydrogen fluoride at from about 200° C. to about 500° C. over a catalyst consisting essentially of an activated aluminum oxide or aluminum oxide hydrate until water ceases to be formed, then (b) passing a mixture of anhydrous hydrogen fluoride and acetylene at a temperature of from about 250° C. to about 400° C. and at a pressure from 0.1 to 4 atmospheres over said pretreated aluminum oxide catalyst, said mixture of hydrogen fluoride and acetylene having a molar ratio of from about 1 to about 5 moles of hydrogen fluoride per mole of acetylene, the feed rate of acetylene in said mixture being from about 10 to about 4,000 milliliters, measured at standard conditions, per gram of catalyst per hour, and (c) recovering from said reaction mixture vinyl fluoride and 1,1-difluoroethane.

5. A process for preparing vinyl fluoride and 1,1-difluoroethane which process comprises (a) passing anhydrous hydrogen fluoride at about 300° C. over a catalyst consisting essentially of an activated aluminum oxide or aluminum oxide hydrates until water ceases to be formed, then (b) passing a mixture of anhydrous hydrogen fluoride and acetylene at a temperature of from about 300° C. to about 350° C. and at a pressure from 25 to 45 p.s.i.g. over said pretreated aluminum oxide catalyst, said mixture of hydrogen fluoride and acetylene having a molar ratio of about 1.3 moles of hydrogen fluoride per mole of acetylene, the feed rate of acetylene in said mixture being from about 10 to about 400 milliliters, measured at standard conditions, per gram of catalyst per hour, and (c) recovering from said reaction mixture vinyl fluoride and 1,1-difluoroethane.

References Cited

UNITED STATES PATENTS

| | | | |
|---|---|---|---|
| 3,187,060 | 6/1965 | Petit et al. | 260—653.4 |
| 2,471,525 | 5/1949 | Hillyer et al. | 260—653.4 |
| 2,634,300 | 4/1953 | Hillyer et al. | 260—653.4 |

DANIEL D. HORWITZ, *Primary Examiner.*